United States Patent [19]

Schoepe et al.

[11] Patent Number: 4,703,653
[45] Date of Patent: Nov. 3, 1987

[54] BALLCOCK FLOAT STRUCTURE

[75] Inventors: Adolf Schoepe; Oscar R. Dufau, both of Fullerton; Kabir Siddiqui, Brea, all of Calif.

[73] Assignee: Fluidmaster, Inc., Anaheim, Calif.

[21] Appl. No.: 803,310

[22] Filed: Dec. 2, 1985

[51] Int. Cl.$^4$ .................. F16K 33/00; G01F 23/06
[52] U.S. Cl. ..................... 73/322.5; 4/366; 137/429
[58] Field of Search .............. 73/322.5; 137/432, 434, 137/433, 426, 429; 4/356, 366, 661

[56] References Cited

U.S. PATENT DOCUMENTS

| | | | |
|---|---|---|---|
| 3,115,153 | 12/1963 | Delamater | 137/426 |
| 3,115,893 | 12/1963 | Doyle | 137/525.3 |
| 3,194,258 | 7/1965 | Grant | 137/414 |
| 3,428,078 | 2/1969 | Christopher | 73/322.5 X |
| 3,428,966 | 2/1969 | Schoepe et al. | 137/432 X |
| 3,498,141 | 3/1970 | Nelson et al. | 73/322.5 X |
| 3,610,271 | 10/1971 | Jarvis | 73/322.5 X |
| 3,906,795 | 9/1975 | Kask | 73/322.5 X |
| 3,916,454 | 11/1975 | Schoepe et al. | 137/432 X |
| 4,080,986 | 3/1978 | Schoepe | 137/432 |

Primary Examiner—Daniel M. Yasich
Attorney, Agent, or Firm—George E. Schick

[57] ABSTRACT

Improved ballcock float structures are provided including a molded, plastic, hollow body formed of cup-like lower and reverse cup-like upper parts. The parts are retained together by snap engagement between the extremities of the parts with positioning abutments for additional stability. A float guide extends vertically through the body having a vertical opening for receiving a ballcock or the like to be controlled by the float. Control of the float for controlling the ballcock is provided by two, tubular liquid vents secured in and extending upwardly from the lower part bottom wall and a similar liquid vent projecting downwardly through and from the upper part top wall. The liquid and air vents project into the interior of the body, but terminate spaced apart and the relative positions thereof determines the performance of the float. Furthermore, it is preferred that the liquid vents will be of a length about equivalent to a collar formed by the lower part around the float guide so that a liquid-tight chamber is formed at all times retaining a certain amount of liquid, and therefore establishing a ballast. The air vent is preferably of a length extending downwardly into the lower part in assembly, thereby confining liquid to the lower part.

12 Claims, 14 Drawing Figures

BALLCOCK FLOAT STRUCTURE

BACKGROUND OF THE INVENTION

This invention relates to ballcock float structures and more particularly to an improved form of float for use with ballcocks and the like. The new float structure includes various improvements which provide the float with one of relatively simple features and which are simple to orginally manufacture, yet the float performs in controlling the liquid in tanks with maximum efficiency and dependability. Furthermore, the various improvements embodied in the float are determined by the strength and rigidity of assembly required and desired. At the same time, various of the elements of the float structure may be slightly altered for various different float structures and various different or altered uses thereof, and these predicated changes and alterations are fully contemplated within the principles of the present invention.

Various forms of float structures have heretofore been provided, the prime purpose of each being to control the liquid level in tanks and the like, one of the prime uses being to control the liquid level, usually water level, by use of ballcocks. In an early form thereof, the float might include something to provide flotation surrounded by an upwardly open container which is partially filled with liquid for determining a ballast weight in the liquid. By operably connecting the float structure to a valve, control of the liquid level will be determined by the amount liquid ballast matched aginst the buoyancy of the overall structure. Obviously, this form of float structure is quite unpredictable and it, furthermore, is relatively difficult to determine and maintain a particular liquid ballast.

A later float structure used for this same purpose was comprised of a member with an open bottom, a closed top and an opening in the side wall thereof for determining the match between buoyancy or flotation and ballast. Dependent on the height in the side wall of the opening, the liquid filled the lower portion of the float structure expelling air out of the opening, while at the same time, the air trapped in the upper portion beneath the closed top wall provided the buoyancy. Again, the match between buoyancy and ballast in this form of float structure is relatively difficult to predict and the resulting overall performance relatively erratic. Furthermore, particularly in the case of ballcocks, the more modern form thereof required that the float structure be removed from the liquid or water in the tank during every flushing action and the refilling thereof, again, this form of float structure would give highly varying results.

Finally, one of the more prevalent types of float structures presently in use, particularly with the more modern ballcock is comprised of a hollow body with an intermediate circumferential opening in the side wall thereof and which is used for liquid for water filling and air escape. In other words, the lower portion of the float was filled with liquid up to the intermediate opening and air was trapped in the upper portion by the lower liquid filling. Thus, the lower portion served as the ballast and the upper portion as the buoyancy for flotation. Although this form of float structure is more efficient and predictable than the prior float structures, it still primarily lacks the versality required of modern float structures. The particular formation adapts the float structure to only a single form of float and to alter the same, the entire float structure must be changed, thereby adding to manufacturing costs.

OBJECTS AND SUMMARY OF THE INVENTION

It is, therefore, an object of this invention to provide a ballcock float structure resulting in ballcock controlling floats which are highly dependable information, yet are relatively simple in principle and use. In the preferred form, the float structure makes use of a hollow body with a vertically extended liquid vent and a vertically extended air vent. The liquid or water inlet vent extends from the bottom wall of the body and the air vent extends downwardly from the top wall. By proper placement, each vent structure regulates its particular medium in a calculated manner for producing a combination of ballast and buoyant float which controls the liquid flow in a perfectly predicted manner.

It is a further object of this invention to provide a ballcock float structure according to the foregoing float formation principles which is relatively easily adaptable to varying forms of ballcocks and other similar types of mechanisms used for the float control therof. For instance, the float structure may be formed for controlling at least two or more different types of ballcocks, each of different form and each requiring somewhat different control. However, the liquid control, even though of different quantity and use, is essentially the same with only minor changes. Overall, the results in each form are readily predictable and are vastly improved over the prior constructions.

It is still a further object of this invention to provide a ballcock float structure which may include all or part of the improvements of the present invention and which results in the improved results of both accuracy and dependability, yet may be formed of relatively economical materials and preferably closely molded to the required form regardless of the particular ballcock or other similar mechanism to be controlled thereby. In any case, in the preferred form, the float structure of the present invention may be economically molded of two distinct parts which, when assembled together in an economical fashion, form the finished float regardless of the particular form. Furthermore, with each form of float structure, the float has the basic float forms efficiently molded therein, and each preferably has variations of float guides and positioning abutments molded therein in a particular manner adapted to each particular form of float structure. The resulting floats, according to the principles of the present invention, are of an improved nature, far superior to the prior constructions.

Other objects and advantages of the invention will be apparent from the following specification and the accompanying drawings which are for the purpose of illustration only.

DESCRIPTION OF THE BEST EMBODIMENTS CONTEMPLATED

Figure 1:
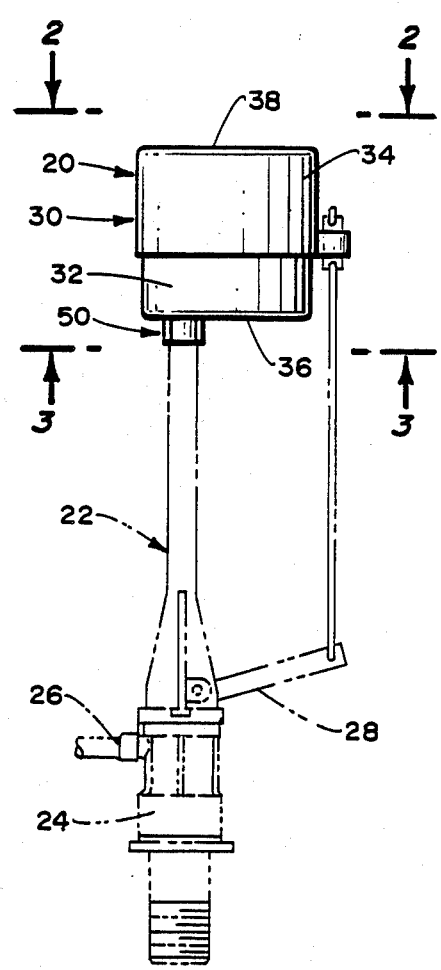
FIG. 1 is a side elevational view of a ballcock mounting a float thereon, the ballcock being shown in phantom lines and float being shown in full lines, the float incorporating a part of the float structure principles of the present invention.
Figure 2:
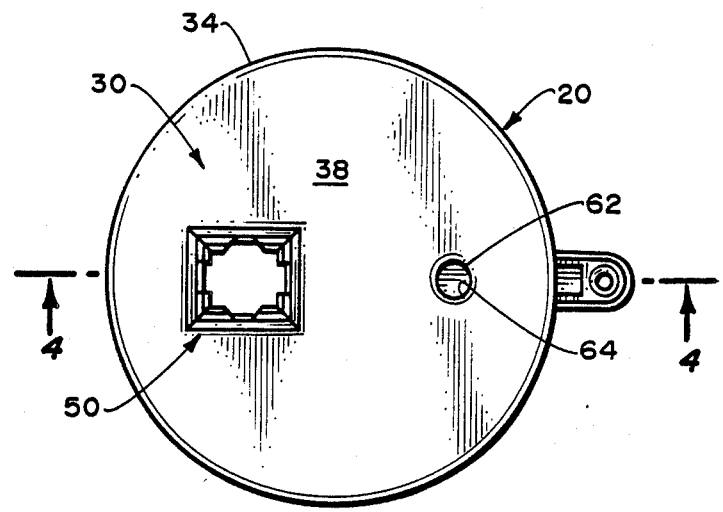
FIG. 2 is an enlarged, top plan view of the float of FIG. 1, looking in the direction of the arrows 2—2 in FIG. 1.
Figure 3:
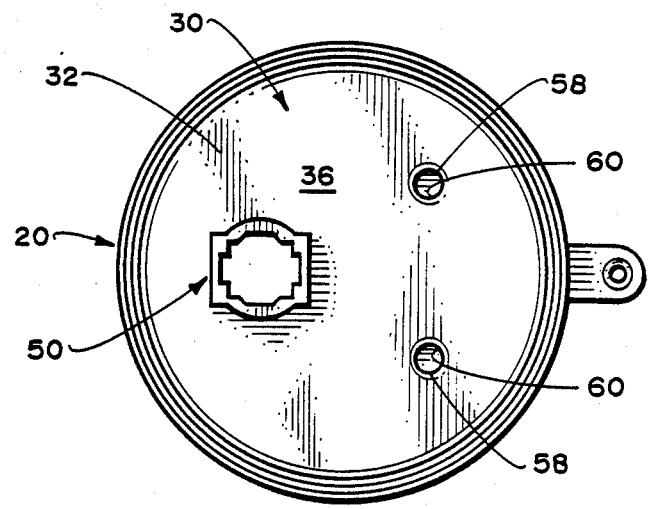
FIG. 3 is an enlarged, bottom plan view of the float of FIG. 1, looking in the direction of the arrows 3—3 of FIG. 1.

The present invention deals with ballcock float structures of the type wherein the resulting floats are used with ballcocks in maintaining liquid levels in toilets, other liquid tanks, watering troughs and similar uses. The present invention includes two embodiments of the ballcock float structure, the first being illustrated in FIGS. 1 through 7 of the drawings and the second in FIGS. 8 through 14 of the drawings. Furthermore, well known materials, parts and procedures may be followed to produce the various of the floats of the present invention with various preferred forms being indicated where some advantage might possibly be derived.

Referring to FIGS. 1 through 7 of the drawings, a first embodiment float generally indicated at 20 is illustrated mounted on and connected for controlling a ballcock generally indicated at 22. The ballcock 22 is of the general type for controlling the liquid level, such as water, in the tank of, for instance, a toilet, this being one of the major uses thereof. Furthermore, the ballcock 22 includes a valve structure 24 regulating water flow therethrough, a refill hose 26 for refilling the toilet being controlled and a valve operating lever 28 upwardly connected to the float 20. In this manner, the valve operating lever 28 is operated by the float to control the valve structure 24 and therefore the liquid or water level in the tank of the toilet controlled by the present construction.

More particularly to the first embodiment float 20 of the present invention, the float is formed by a hollow body 30 which is a main vertical axis cylinder and is comprised of a cup-like lower part 32 and a reverse cup-like upper part 34. The lower part 32 has a generally horizontal, circular bottom wall 36 and the upper part a generally horizontal, circular top wall 38 with each extending vertically in a lower side wall 40 and upper side wall 42. As seen, for instance, in FIGS. 4 and 6, the upper side wall 42 of the upper part 34 telescopes downwardly a short distance over the lower side wall 40 of the lower part 32.

Figure 4:
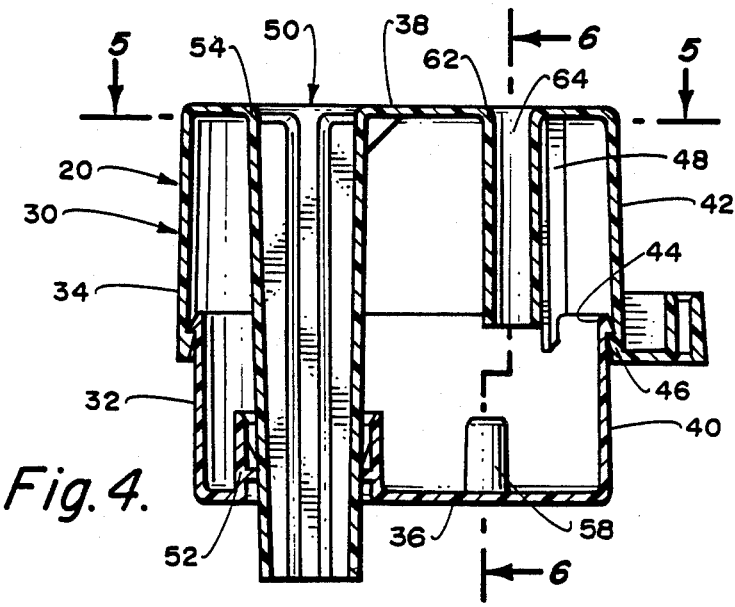
FIG. 4 is a vertical, sectional view, looking in the direction of the arrows 4—4 in FIG. 2.
Figure 5:
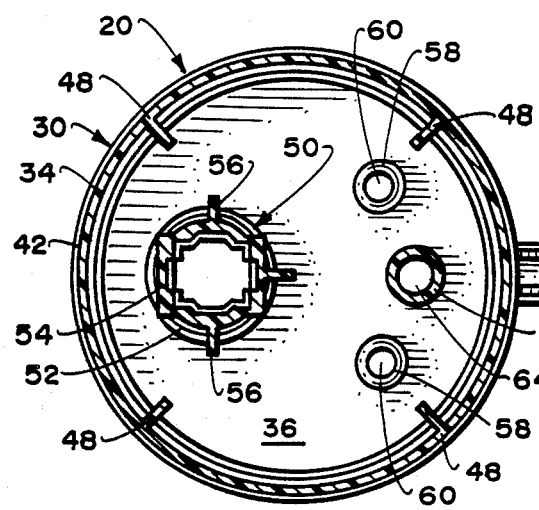
FIG. 5 is a horizontal sectional view, looking in the direction of the arrows 5—5 in FIG. 4.
Figure 6:
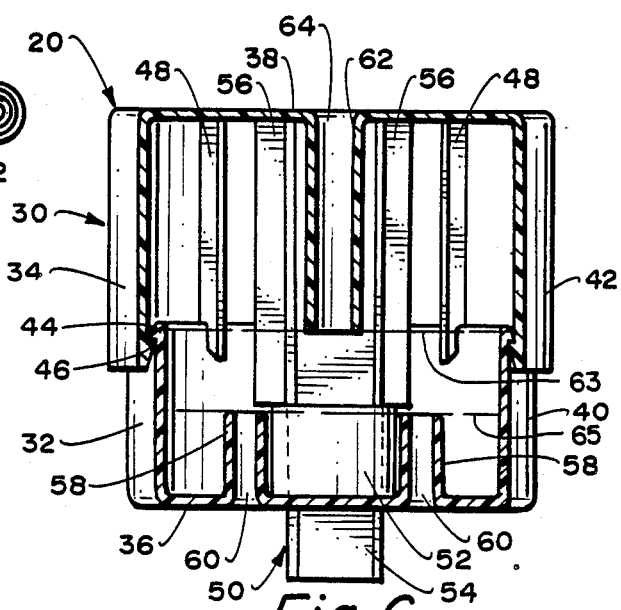
FIG. 6 is a vertical, sectional view, looking in the direction of the arrows 6—6 in FIG. 4.

As also best seen in FIGS. 4 and 6, the telescoping portions of the lower and upper side walls 40 and 42 are hook snap engaged, the lower side wall 40 having an outwardly facing hook 44 and the upper side wall 42 having an inwardly facing hook 46, the hooks snap engaging when the lower and upper parts 32 and 34 are brought into proper assembly. Furthermore, to aid in proper alignment during the lower and upper part assembly, the upper part 34 has a number, preferably four, of outer positioning abutments 48 which extend inwardly from the upper side wall 42 and extend downwardly to hook over the upper extremity of the lower part 32, thereby forming both horizontal and vertical stability. Thus, the lower and upper parts 32 and 34 may be conveniently molded of a relatively thin plastic of appropriate density, and due to at least the hook snap engagement of the hooks 44 and 46 on the lower and upper side walls 40 and 42, combined with outer positioning abutments 48, will provide a rigid float 20 in the preferred form thereof.

A float guide generally indicated at 50 is formed partially in the lower part 32 and partially in the upper part 34. A lower float guide part 52 is formed on the inner side of the lower part bottom wall 36 and is comprised of a hollow cylinder with inner triangular legs that extend down to a nearly rectangular opening in the lower part bottom wall 36. This lower float guide part 52 may, of course, likewise be molded as an integral part of the lower part 32.

An upper float guide part 56 may be similarly molded extending through the upper part top wall 38 and ultimately through and from the lower float guide part 52 so as to extend downwardly therefrom. As seen particularly in FIGS. 4 and 7, the upper float guide part 54 is comprised of a generally elongated, generally rectangular tube which has the opening at the upper part top wall 38 and extends downwardly through the interior of the body 30, through the lower float guide part 52 of the lower part 32 and finally beyond the lower part bottom wall 36. As probably best seen in FIG. 7, preferably several float guide positioning abutments 56 are formed on and extending downwardly to engage the lower float guide part 52, that is, the internal hollow cylinder thereof, to again add proper positioning and stability during and after the overall assembly.

Finally, and most important to the principles of the present invention, a liquid vent and preferably two liquid vents 58 are molded in the lower part bottom wall 36 extending upwardly therefrom and forming liquid vent openings 60. Also, an air vent 62 is molded in the upper part top wall 38 extending downwardly therefrom and forming an air vent opening 64, the air vent opening being of increased opening diameter from the individual liquid vent openings as seen for instance in FIGS. 6 and 7. Furthermore, and probably best seen in FIGS. 4 and 6, in assembly, the liquid vents 58, which are of the same size, terminate upwardly spaced downwardly from downward termination of the air vent 62. Still further, it is preferred that the lower float guide part 52 terminates upwardly at or above the liquid vents 58, and the air vent 62 in such assembly will terminate below the upper termination of the lower part lower side wall 40, the purpose of each to be hereinafter discussed.

Figure 7:
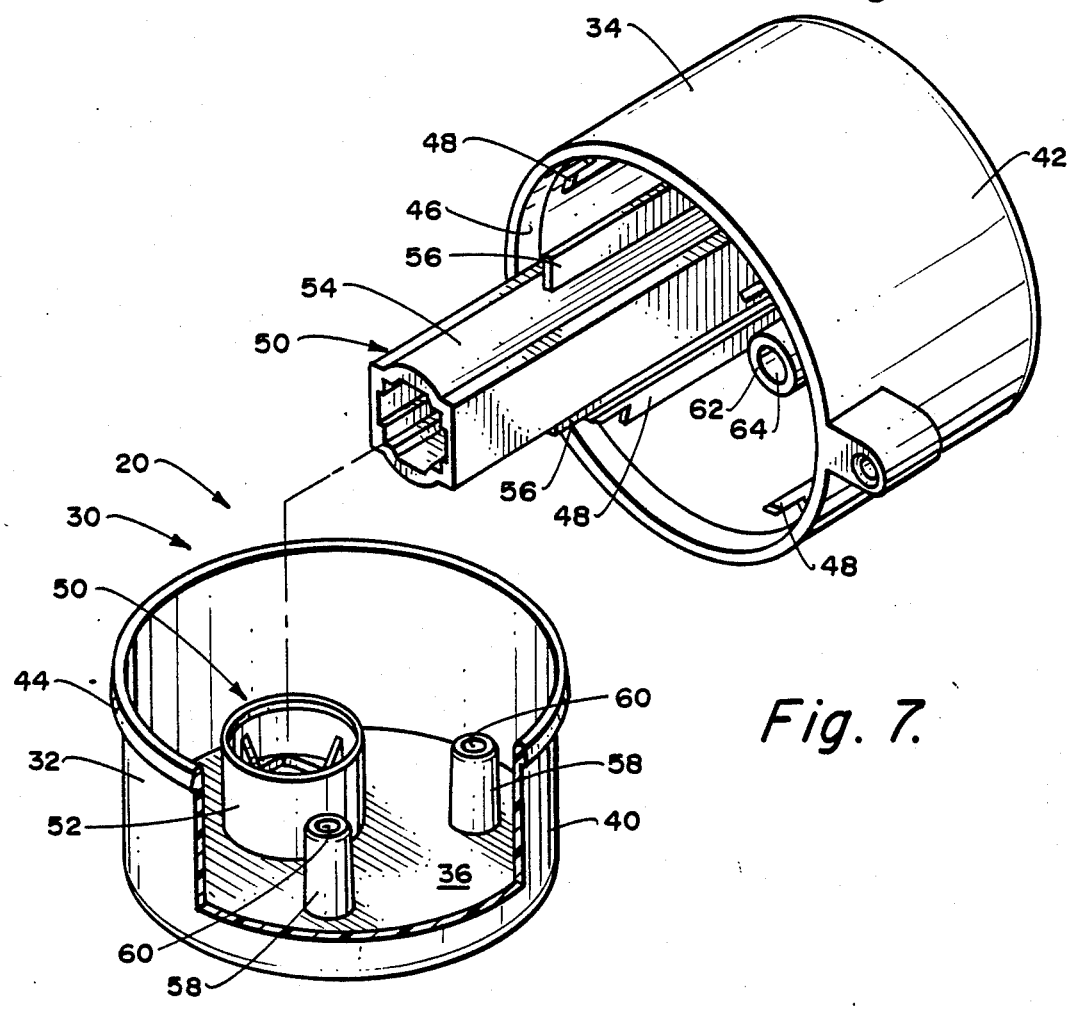
FIG. 7 is an exploded view of the parts of the float construction of FIGS. 1 through 6, with certain side parts removed for clarity.
Figure 8:
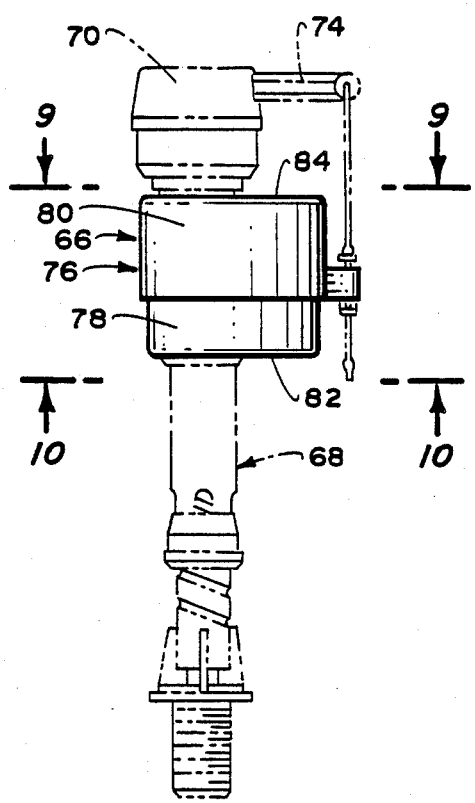
FIG. 8 is a side elevation of a ballcock mounting a float, the ballcock being shown in phantom lines and the float being shown in solid lines, and the float incorporating further features of the present invention.
Figure 9:
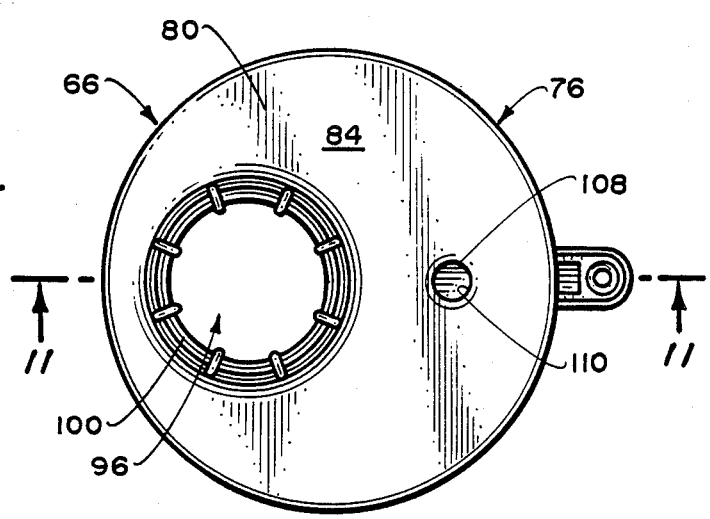
FIG. 9 is an enlarged, top plan view of the float of FIG. 8, looking in the direction of the arrows 9—9 of FIG. 8.
Figure 10:
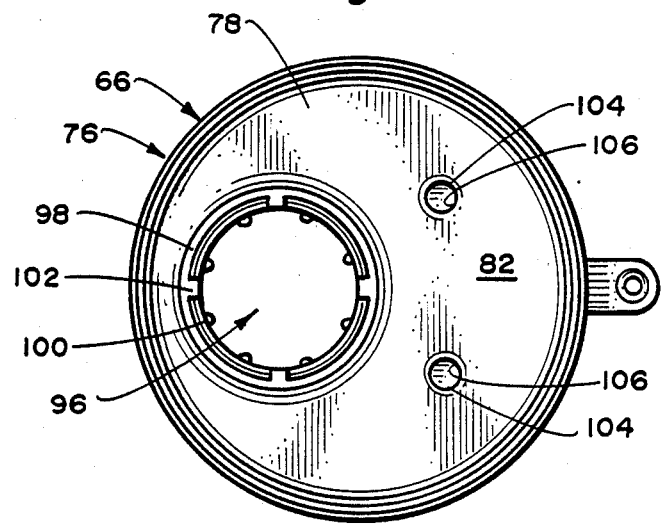
FIG. 10 is an enlarged, bottom plan view of the float of FIG. 8, looking in the direction of the arrows 10—10 in FIG. 8.

In original manufacture of the first embodiment float 20 for use with the ballcock 22, as previously stated, the float is formed preferably of two molded plastic parts wherein the relatively complicated contours and elements may be easily provided. Furthermore, these lower and upper parts 32 and 34, as initially shown in FIG. 7, are brought into telescopic assembly resulting the assembly of the body 30 as shown. The outwardly facing hook 44 on the lower part 32 will snap engage with the inwardly facing hook 46 on the upper part 34, while at the same time, the outer positioning abutments 48 on the upper part 34 will engage downwardly over the upper termination of the lower side wall 40 of the lower part 32, and the float guide positioning abutments 56 on the upper float guide part 54 will also engage downwardly against the lower float guide part 52. Thus, a rigid assembly of the float 20 is obtained.

In use, the float 20 is assembled over the ballcock 22, the ballcock being vertically moveably received upwardly through the upper float guide part 54, as seen in FIG. 1. At this point of original assembly, the float 20 is held under the liquid level to be partially filled with the liquid. With the preferred embodiment shown, the float 20 would have a buoyancy liquid level 63 (FIG. 6) at the upper liquid level of the particular tank approximately at the lower termination of the air vent 62. In other words, with the particular dimensioning of the air vent 62 extending downwardly to just below the upward termination of the lower part 32, approximately the lower part 32 would be filled with liquid and the remaining upper space within the body 30, which would be nearly the entire of the upper part 34, would be filled with air establishing the buoyancy liquid level 63. Thus, the liquid in the float 20 serving as buoyancy liquid ballast and the air therein serving as buoyancy or flotation.

Also, when the particular tank is emptied to a lower water level, the float 20 would move downwardly along the ballcock 22 a moderate amount within the limitations of the ballcock 22. This would leave the float 20 spaced above the now liquid level and cause the liquid level in the float 20 to reduce to a minimum ballast liquid level 65 (FIG. 6). However, in view of liquid-tight formation of the lower float guide part 52 within the lower part 32, and the upward extension of the liquid vents 58 therein, the liquid level within the float 20 will never reduce below the lower of the two, that is, the lower float guide part 52 or the liquid vents 58 in this case, the liquid vents 58. This, thereby, serves to provide the minimum ballast liquid level 65 for the float 20.

A second embodiment of the ballcock float structure of the present invention is illustrated in FIGS. 8 through 14. This second embodiment is quite similar to the first embodiment with some slight changes to adapt the same to a different form of ballcock. However, it is preferred to provide this second embodiment float again of molded plastic parts whereby a relatively complex structure may be formed in an accurate and simple manner.

The float generally indicated at 66 is adapted for use on a ballcock generally indicated at 68 and having the usual valve structure 70, a refill hose (not shown) and the float being connected to a valve operating lever 74. In this case, it will be noted that the float 66 is mounted on the ballcock 68 beneath the valve structure 70, but the general operation thereof is precisely the same.

Figure 11:
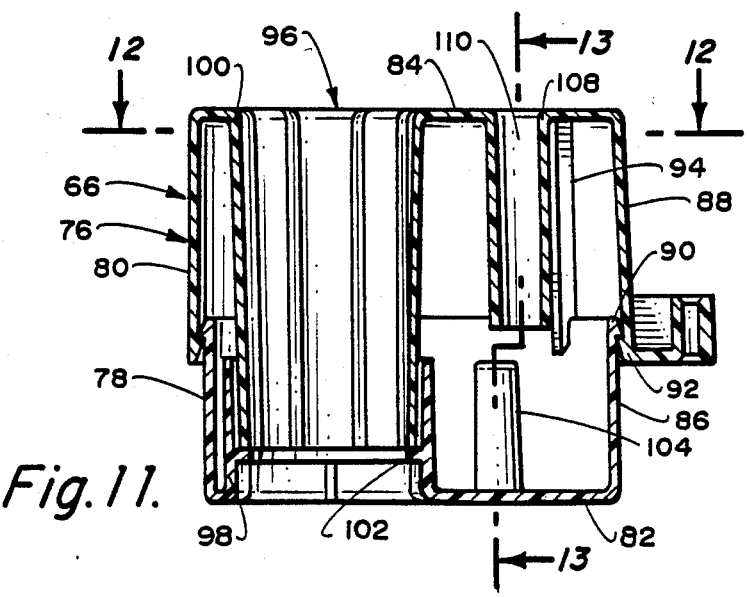
FIG. 11 is a vertical section, looking in the direction of the arrows 11—11 in FIG. 9.
Figure 12:
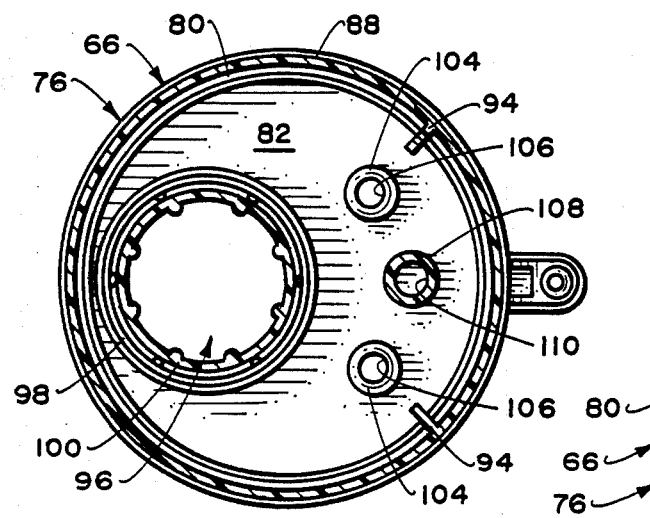
FIG. 12 is a horizontal section, looking in the direction of the arrows 12—12 in FIG. 11.

Referring particularly to the float 66, it has a similar body 76 which is formed by a cup-like lower part 78 and a reverse cup-like upper part 80. A flat, circular bottom wall 82 is formed on the lower part 78 and a similar flat, circular top wall 84 is formed on the upper part 80. The lower part 78 is outwardly defined by the hollow cylindrical lower side wall 86 and the upper part 80 is defined by the upper side wall 88. Again, an outward facing hook 90 on the lower part 78 snap engages with an inwardly facing hook 92 on the upper part 80 and outer positioning abutments 94, as shown in FIG. 11 similar to the previous embodiment are variously located in the upper part 80 inwardly of the upper side wall 88 for engaging downwardly over the upper termination of the lower part 78, are to add rigidity and positioning to the joining assembly of the upper and lower side walls 88 and 86.

A float guide generally indicated at 96 is preferably located internally of the float 66 within the body 76 and includes a lower float guide part 98 and an upper float guide part 100. In this case, you will note that the lower and upper float guide parts 98 and 100 are generally cylindrical in configuration and relatively large for matching the larger cylindrical contour of the ballcock 68. Furthermore, these float guide parts 98 and 100 are moderately telescoped with the upper float guide part 100 engaging downwardly with a float guide positioning abutment 102 within the lower portion of the lower float guide part 98, this being best seen in FIG. 11.

Figure 13:
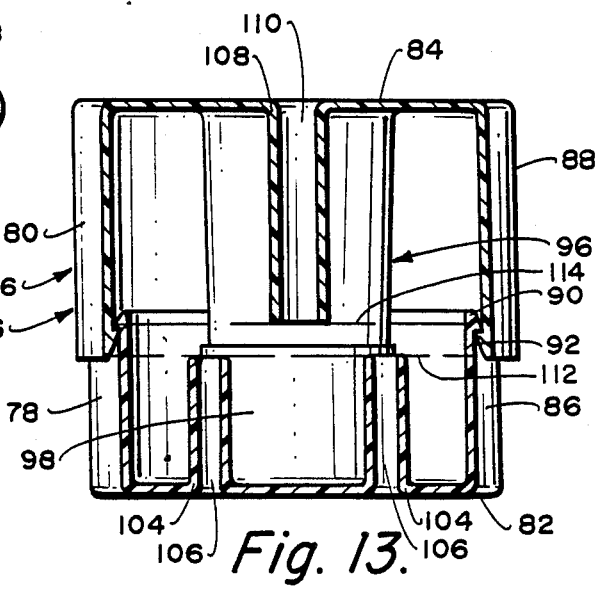
FIG. 13 is a vertical section, looking in the direction of the arrows 13—13 in FIG. 11.
Figure 14:
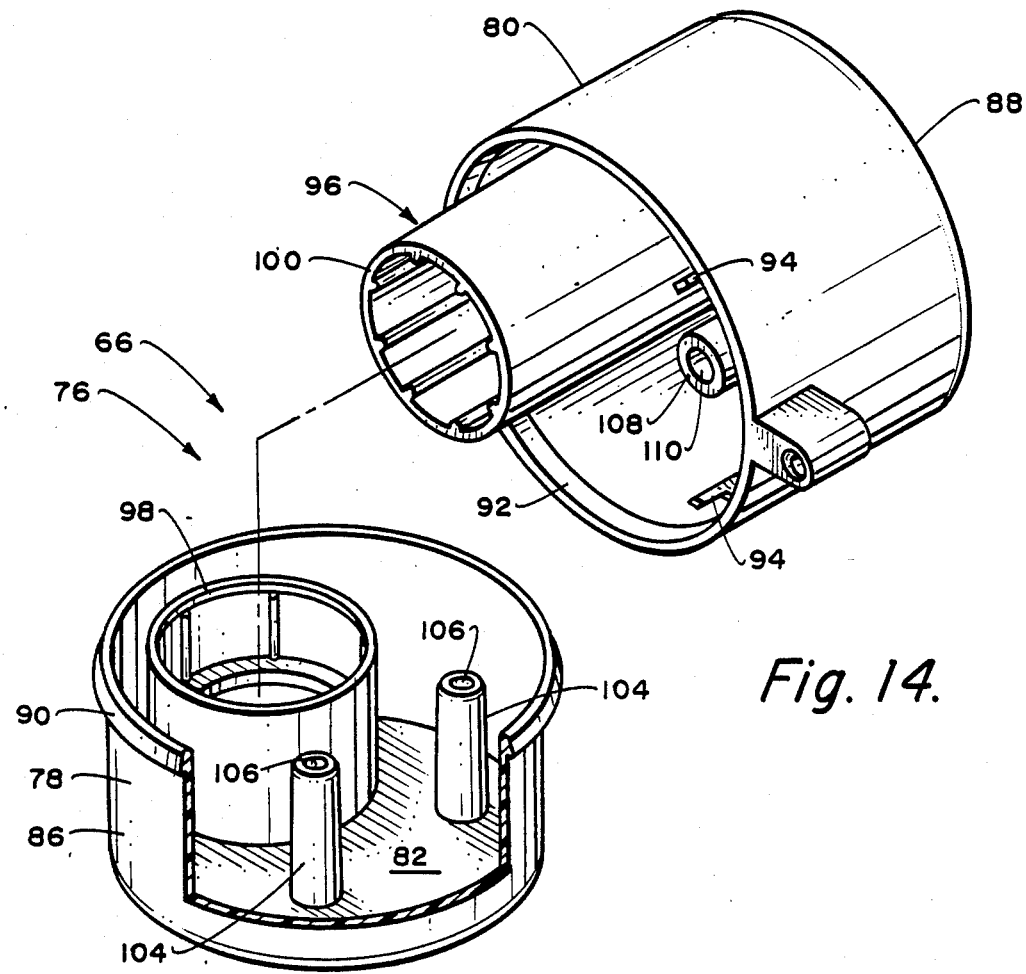
FIG. 14 is an exploded view of the float of FIG. 8, with parts thereof removed for clarity.

This second embodiment float 66 includes the same twin liquid vents 104 forming a liquid vent opening 106 and air vent 108 forming an air vent opening 110. However, at least the liquid vents 104 are of different lengths due to the different configuration and uses of the float. As seen in FIGS. 11, 13 and 14, the liquid vents 104 are of greater vertical lengths to match the lower float guide part 98 and provide an increased ballast as indicated by the minimum ballast liquid level 112 in FIG. 13 similar to the first embodiment. The air vent 108 is approximately the same size as before and again, serves to establish the air vent buoyancy or flotation for the float 66 as indicated by the buoyancy liquid level 114 also in FIG. 13 again as in the first embodiment.

The operation and use of the second embodiment float 66 is substantially the same. It operates the ballcock 66 to control the liquid level in a tank, such as the tank of a toilet and the like. The only real difference, which is not one of function, is that the float 66 is beneath the ballcock valve structure 70 and operates the same from this lower postion, either position being common in ballcocks.

According to the principles of the present invention, therefore, various improvements to ballcock float structures have herein been provided including one of relative simplicity in both manufacturing and use of the particular embodiment of float structure, yet the floats resulting from the various changes in float structure perform in perfectly predictable manners resulting in a maximum in control and effectiveness. The basic construction includes relatively simple features, a hollow body with a liquid vent from the bottom therof and an air vent from the top thereof, the liquid vent serving to establish the minimum ballast and the air vent serving to establish the greater buoyancy ballast with the air buoyancy. Many alternatives may be made such as vent size and shape changes, all of which are relatively simple to incorporate and are contemplated according to the present invention. Furthermore, the many possible floats which may be produced according to the various float structures, all may be manufactured preferably by molding from an appropriate plastic, so that various contours and shapes for adding to the effectiveness of the floats may be added, while still maintaining the maximum of simplicity.

Although the principles of the present invention have been herein illustrated in particular embodiments of the ballcock float structure of the present invention, it is not intended to limit such principles to those constructions alone, since the same principles are readily adaptable to various other forms of ballcock float structures. Thus, the various principles of the present invention should be broadly construed and not limited beyond the specific limitations set forth in the appended claims including the patent equivalents thereof.

We claim:

1. In a float of the type for use with ballcocks and the like in controlling the liquid level in tanks, the float having a generally hollow body with top, bottom and side walls, a float guide on said float for guiding movement thereof along a generally vertical path; the improvements including: at least one tubular liquid vent secured to said bottom wall and opening downwardly at said bottom wall, said liquid vent projecting generally vertically upwardly interiorly of said body and having an upper end opening spaced upwardly within said body, said upper end opening being in a lower horizontal plane; at least one tubular air vent secured to said top wall and opening upwardly at said top wall, said air vent projecting generally vertically downwardly interiorly of said body and having a lower end opening spaced downwardly within said body, said lower end opening being in an upper horizontal plane; said lower horizontal plane of said liquid vent upper end opening being spaced downward from said upper horizontal plane of said air vent lower end opening; the length of said liquid vent in upward extension within said float and said lower horizontal plane of said liquid vent upper end opening determining the minimum surface level of the liquid in said float and the resultant minimum liquid ballast for said float when said float is free of any liquid support; the length of said air vent in downward extension within said float and said upper horizontal plane of said air vent lower end opening determining the maximum surface level of the liquid in said float and the resultant air buoyancy of said float by air trapped within said float above said air vent downward extension when said float is supported totally by liquid.

2. In a float as defined in claim 1 in which said float body is formed of cup-like lower and reverse cup-like upper parts with side walls of said parts terminating in snap connection means connecting said walls.

3. In a float as defined in claim 1 in which said float body is formed of cup-like lower and reverse cup-like upper parts, said body parts having end portions of side walls thereof vertically overlapping and joined by hook snap connection means.

4. In a float as defined in claim 1 in which said float body is formed of cup-like lower and reverse cup-like upper parts with side walls of said lower and upper parts being joined; in which said float guide is formed partially as a part of said body lower part and partially as a part of said body upper part, said float guide parts passing through said body interiorly of said body and between said top and bottom walls, said float guide parts being telescoped upon assembly of said body lower and upper parts, at least said part of said float guide forming a part of said body lower part being substantially liquid-tight from said bottom wall up to a vertical level of upward termination of said liquid vent; and in which said air vent of said body upper part terminates downwardly at a lower horizontal level than upward termination of said body lower part side wall.

5. In a float as defined in claim 1 in which there are two of said liquid vents substantially similar in length and size and similarly secured to said bottom wall, the upper end openings of said two liquid vents being spaced downward from said lower end opening of said air vent.

6. In a float as defined in claim 1 in which said float guide passes through said body interiorly of said body between said top and bottom walls, said float guide being substantially liquid-tight at least from said body bottom wall up to a vertical level of upward termination of any body liquid vents.

7. In a float as defined in claim 1 in which said float body is formed of cup-like lower and reverse cup-like upper parts with side walls of said parts terminating in snap connection means connecting said walls; and in which said float guide is formed partially as a part of said body lower part and partially as a part of said body upper part, said float guide parts passing through said body interiorly of said body and between said top and bottom walls, said float guide parts being telescoped upon assembly of said body lower and upper parts, at least said part of said float guide forming a part of said body lower part being substantially liquid-tight with said bottom wall and from said bottom wall vertically up to said upper end opening of said at least one liquid vent.

8. In a float as defined in claim 1 in which said float body is formed of cup-like lower and reverse cup-like upper parts with side walls of said parts terminating in snap connection means connecting said walls; in which said float guide is formed partially as a part of said body lower part and partially as a part of said body upper part, said float guide parts passing through said body interiorly of said body and between said top and bottom walls, said float guide parts being telescoped upon assembly of said body lower and upper parts, at least said part of said float guide forming a part of said body lower part being substantially liquid-tight with said bottom wall and from said bottom wall vertically up to said upper end opening of said at least one liquid vent; and in which said body includes two, horizontally spaced, liquid vents substantially similar in length and size similarly secured to said bottom wall.

9. In a float as defined in claim 1 in which said float body is formed of cup-like lower and reverse cup-like upper parts with side walls of said lower and upper parts being joined; and in which said air vent of said body upper part extends downwardly to a horizontal level below upper extremities of said lower part side wall.

10. In a float as defined in claim 1 in which said body is formed of cup-like lower and reverse cup-like upper parts having side walls terminating in snap connection means connecting said walls; and in which positioning abutment means are formed on said body lower and upper parts for joining in abutments when said body is assembled.

11. In a float as defined in claim 1 in which said float body is formed of cup-like lower and reverse cup-like upper parts having side walls terminating in snap connection means connecting said walls; in which said float guide is formed partially as a part of said body lower part and partially as a part of said body upper part, said float guide parts passing through said body interiorly of said body and between said top and bottom walls, said float guide parts being telescoped upon assembly of said body lower and upper parts, at least said part of said float guide forming a part of said body lower part being substantially liquid-tight from said bottom wall vertically up to said upper end opening of said at least one liquid vent; and in which positioning abutment means are formed on said body lower and upper parts for joining during assembly of said lower and upper parts.

12. In a float as defined in claim 1 in which said float body is formed of cup-like lower and reverse cup-like upper parts having side walls terminating in snap connection means connecting said walls; in which said float guide is formed partially as a part of said body lower part and partially as a part of said body upper part, said float guide parts passing through said body interiorly of said body and between said top and bottom walls, said float guide parts being telescoped upon assembly of said body lower and upper parts, at least said part of said float guide forming a part of said body lower part being substantailly liquid-tight from said bottom wall vertically up to said upper end opening of said at least one liquid vent; and in which positioning abutment means are formed between lower and upper of said part side walls and also between parts of said float guide for being joined to maintain proper alignment in assembly of said body.

* * * * *